US010410315B2

(12) United States Patent
Chen et al.

(10) Patent No.: US 10,410,315 B2
(45) Date of Patent: Sep. 10, 2019

(54) METHOD AND APPARATUS FOR GENERATING IMAGE INFORMATION

(71) Applicant: Baidu Online Network Technology (Beijing) Co., Ltd., Beijing (CN)

(72) Inventors: Sili Chen, Beijing (CN); Yuan Lin, Beijing (CN); Yuhua Dong, Beijing (CN); Binbin Zheng, Beijing (CN); Yijie Yan, Beijing (CN); Zhongqin Wu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 120 days.

(21) Appl. No.: 15/720,966

(22) Filed: Sep. 29, 2017

(65) Prior Publication Data

US 2018/0255282 A1 Sep. 6, 2018

(30) Foreign Application Priority Data

Mar. 3, 2017 (CN) .......................... 2017 1 0124284

(51) Int. Cl.
*G06T 3/00* (2006.01)
*H04N 1/00* (2006.01)
*H04N 101/00* (2006.01)

(52) U.S. Cl.
CPC ....... *G06T 3/0006* (2013.01); *H04N 1/00007* (2013.01); *H04N 1/0009* (2013.01);
(Continued)

(58) Field of Classification Search
CPC .............. G06T 3/0006; H04N 1/00007; H04N 1/00031; H04N 1/00045; H04N 1/00053;
(Continued)

(56) References Cited

U.S. PATENT DOCUMENTS

2011/0299770 A1* 12/2011 Vaddadi ............... G06K 9/6211
382/165
2013/0004079 A1* 1/2013 Yamada ............... G06K 9/4642
382/190
(Continued)

OTHER PUBLICATIONS

Liu R. et al., "View synthesis based on image reprojection," Journal of Computer Applications, vol. 30, No. 4, Apr. 2010, pp. 898-901 (7 pages) (w/English abstract).
Zhang Y. et al., "Homography of UAV downward-looking ground images," Application Research of Computers, vol. 28, No. 2, Feb. 2011, pp. 749-752 (4 pages) (w/English abstract).

*Primary Examiner* — Leon Flores
(74) *Attorney, Agent, or Firm* — Nixon Peabody LLP

(57) ABSTRACT

A method and apparatus for generating image information. A specific embodiment of the method includes: acquiring a rotation angle and a scaling of a target image relative to a reference image, and acquiring an intrinsic parameter of a video camera collecting the reference image; generating a projective transformation matrix based on the rotation angle, the scaling and the intrinsic parameter; generating a coordinate offset of the each neighborhood pixel of the feature point in the reference image; generating, based on a coordinate of the feature point in the reference image, the coordinate offset of the each neighborhood pixel of the feature point in the reference image and the projective transformation matrix, coordinates of the each neighborhood pixel of the feature point in the reference image; and generating a feature point descriptor of the feature point.

13 Claims, 4 Drawing Sheets

(52) U.S. Cl.
CPC ..... *H04N 1/00031* (2013.01); *H04N 1/00045* (2013.01); *H04N 1/00053* (2013.01); *H04N 1/00061* (2013.01); *H04N 1/00068* (2013.01); *H04N 1/00087* (2013.01); *H04N 1/00244* (2013.01); *H04N 1/00307* (2013.01); *G06T 2207/10004* (2013.01); *G06T 2207/20081* (2013.01); *H04N 2101/00* (2013.01); *H04N 2201/0039* (2013.01); *H04N 2201/0044* (2013.01); *H04N 2201/0049* (2013.01); *H04N 2201/0053* (2013.01); *H04N 2201/0055* (2013.01); *H04N 2201/0096* (2013.01)

(58) Field of Classification Search
CPC ........... H04N 1/00061; H04N 1/00068; H04N 1/00087; H04N 1/0009; H04N 1/00244; H04N 1/00307
See application file for complete search history.

(56) References Cited

U.S. PATENT DOCUMENTS

| | | | |
|---|---|---|---|
| 2016/0014396 A1* | 1/2016 | Glinec | A61C 9/0053 433/29 |
| 2016/0284092 A1* | 9/2016 | Matsushita | G06K 9/00201 |
| 2017/0019655 A1* | 1/2017 | Mueller | H04N 13/0217 |
| 2017/0154204 A1* | 6/2017 | Ryu | G06K 9/00208 |

* cited by examiner

METHOD AND APPARATUS FOR GENERATING IMAGE INFORMATION

CROSS-REFERENCE TO RELATED APPLICATION

This application claims the priority of Chinese Patent Application No. 201710124284.9, entitled "Method and Apparatus for Generating Image Information," filed on Mar. 3, 2017, the content of which is incorporated herein by reference in its entirety.

TECHNICAL FIELD

The present disclosure relates to the field of computer technology, specifically to the field of image processing technology, and more specifically to a method and apparatus for generating image information.

BACKGROUND

Image information extraction is the key technology in image registration and recognition. The effect of image information extraction tends to directly determine the effect of image registration and recognition. Therefore, how to extract image information with a strong expression capability from the image is a research focus in the field of image processing technology. In this regard, the feature point descriptor can describe the change between a feature point and its adjacent pixel, and may retain the invariant feature of the feature point (for example, the invariability in rotation or scale). Therefore, the feature point descriptor as image information with a strong expression capability has been widely applied in the field of image processing technology.

However, the existing method for generating a feature point descriptor for training a model is usually to first generate a target image by projective transforming a reference image, and then acquire coordinates of each neighborhood pixel of a feature point from the target image to generate the feature point descriptor. Generally it is necessary to perform projective transformation to all pixels in the reference image to generate the target image during the process of generating the feature point descriptor, thus causing a high computational complexity for generating the feature point descriptor.

SUMMARY

The objective of the present disclosure is to provide an improved method and apparatus for generating image information, in order to solve the technical problem mentioned in the foregoing Background section.

In a first aspect, embodiments of the present disclosure provides a method for generating image information, comprising: acquiring a rotation angle and a scaling of a target image relative to a reference image, and an acquiring intrinsic parameter of a video camera collecting the reference image; generating a projective transformation matrix based on the rotation angle, the scaling and the intrinsic parameter; generating, based on the projective transformation matrix and a coordinate offset of each neighborhood pixel of a preset feature point in the target image, a coordinate offset of each neighborhood pixel of the feature point in the reference image; generating, based on a coordinate of the feature point in the reference image, the coordinate offset of the each neighborhood pixel of the feature point in the reference image and the projective transformation matrix, coordinates of the each neighborhood pixel of the feature point in the reference image; and generating, based on the coordinates of the each neighborhood pixel of the feature point in the reference image, a feature point descriptor of the feature point.

In some embodiments, the generating a projective transformation matrix based on the rotation angle, the scaling and the intrinsic parameter comprises: generating a rotation matrix, a translation matrix and an intrinsic parameter matrix based on the rotation angle, the scaling and the intrinsic parameter; and generating the projective transformation matrix based on the rotation matrix, the translation matrix and the intrinsic parameter matrix.

In some embodiments, the generating, based on a coordinate of the feature point in the reference image, the coordinate offset of the each neighborhood pixel of the feature point in the reference image and the projective transformation matrix, coordinates of the each neighborhood pixel of the feature point in the reference image, comprises: generating, based on the coordinate of the feature point in the reference image, a third dimension of the projective transformation matrix and the coordinate offset of the each neighborhood pixel of the feature point in the reference image, non-normalized coordinates of the each neighborhood pixel of the feature point in the reference image; and normalizing the non-normalized coordinates of the each neighborhood pixel of the feature point in the reference image, and generating normalized coordinates of the each neighborhood pixel of the feature point in the reference image.

In some embodiments, the generating, based on the coordinates of the each neighborhood pixel of the feature point in the reference image, a feature point descriptor of the feature point, comprises: generating the feature point descriptor of the feature point by using a random ferns algorithm to process the coordinates of the each neighborhood pixel of the feature point in the reference image.

In some embodiments, the method further comprises: reconstructing three-dimensionally the reference image based on the feature point descriptor of the feature point.

In some embodiments, the method further comprises: training, by using a machine leaning method based on the feature point descriptor of the feature point and a category of the feature point, to obtain a feature point classification model, wherein the feature point classification model is used to characterize a correspondence between the feature point descriptor of the feature point and the category of the feature point.

In a second aspect, embodiments of the present disclosure provides an apparatus for generating image information, comprising: an acquisition unit, configured to acquire a rotation angle and a scaling of a target image relative to a reference image, and acquire an intrinsic parameter of a video camera collecting the reference image; a projective transformation matrix generating unit, configured to generate a projective transformation matrix based on the rotation angle, the scaling and the intrinsic parameter; a coordinate offset generating unit, configured to generate, based on the projective transformation matrix and a coordinate offset of each neighborhood pixel of a preset feature point in the target image, a coordinate offset of each neighborhood pixel of the feature point in the reference image; a coordinate generating unit, configured to generate, based on a coordinate of the feature point in the reference image, the coordinate offset of the each neighborhood pixel of the feature point in the reference image and the projective transformation matrix, coordinates of the each neighborhood pixel of the feature point in the reference image; and a feature point descriptor generating unit, configured to generate, based on the coordinates of the each neighborhood pixel of the feature point in the reference image, a feature point descriptor of the feature point.

In some embodiments, the projective transformation matrix generating unit comprises: a first matrix generating subunit, configured to generate a rotation matrix, a translation matrix and an intrinsic parameter matrix based on the rotation angle, the scaling and the intrinsic parameter; and a second matrix generating subunit, configured to generate the projective transformation matrix based on the rotation matrix, the translation matrix and the intrinsic parameter matrix.

In some embodiments, the coordinate generating unit comprises: a non-normalized coordinate generating subunit, configured to generate, based on the coordinate of the feature point in the reference image, a third dimension of the projective transformation matrix and the coordinate offset of the each neighborhood pixel of the feature point in the reference image, non-normalized coordinates of the each neighborhood pixel of the feature point in the reference image; and a normalized coordinate generating subunit, configured to normalize the non-normalized coordinates of the each neighborhood pixel of the feature point in the reference image, and generate normalized coordinates of the each neighborhood pixel of the feature point in the reference image.

In some embodiments, the feature point descriptor generating unit is further configured to: generate the feature point descriptor of the feature point by using a random ferns algorithm to process the coordinates of the each neighborhood pixel of the feature point in the reference image.

In some embodiments, the apparatus further comprises: a three-dimension reconstructing unit, configured to reconstruct three-dimensionally the reference image based on the feature point descriptor of the feature point.

In some embodiments, the apparatus further comprises: a training unit, configured to train, by using a machine leaning method based on the feature point descriptor of the feature point and a category of the feature point, to obtain a feature point classification model, wherein the feature point classification model is used to characterize a correspondence between the feature point descriptor of the feature point and the category of the feature point.

In a third aspect, embodiments of the present disclosure provides a server, comprising: one or more processors; a storage, to store one or more programs; and when the one or more programs being executed by the one or more processors, cause the one or more processors to perform a method described by any one of the implementations in the first aspect.

In a fourth aspect, embodiments of the present disclosure provides a computer readable storage medium storing a computer program thereon, the computer program, when executed by a processor, performs a method described by any one of the implementations in the first aspect.

The method and apparatus for generating image information provided by the embodiments of the present disclosure generates a projective transformation matrix based on an acquired rotation angle, a scaling of a target image relative to a reference image and acquired intrinsic parameter of a video camera collecting the reference image, generates a coordinate offset of the each neighborhood pixel of the feature point in the reference image based on the projective transformation matrix and a coordinate offset of each neighborhood pixel of a feature point in the target image, then generates coordinates of the each neighborhood pixel of the feature point in the reference image based on a coordinate of the feature point in the reference image, the coordinate offset of the each neighborhood pixel of the feature point in the reference image and the projective transformation matrix, and finally generates the feature point descriptor of the feature point based on the coordinates of the each neighborhood pixel of the feature point in the reference image. It achieves a projective transformation of the coordinates of each neighborhood pixel of the feature point in the target image to the reference image without generating the target image, and extracts the projective transformed coordinates of each neighborhood pixel of the feature point from the reference image to generate the feature point descriptor, thereby reducing the computational complexity of generating the feature point descriptor.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
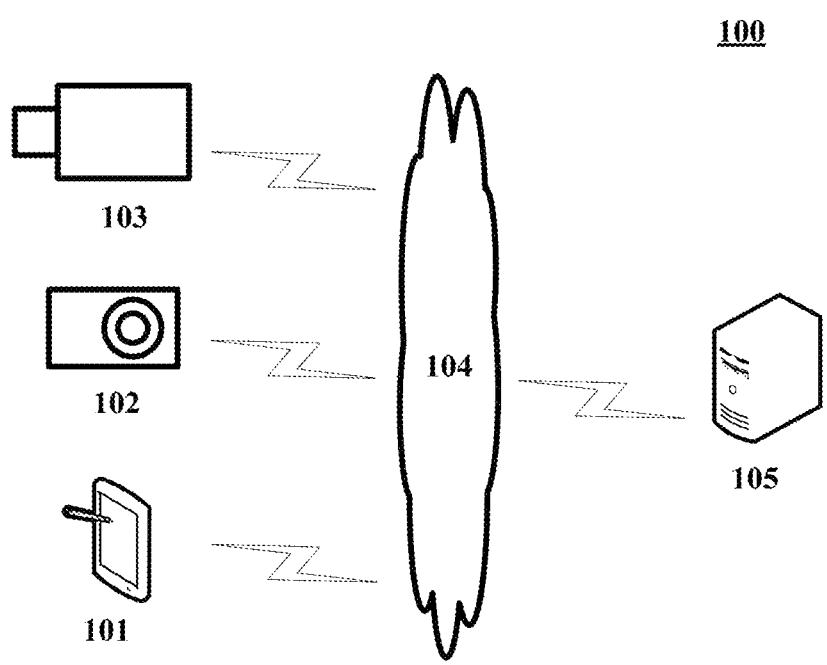
FIG. 1 is an exemplary system architecture diagram in which embodiments of the present disclosure may be applied.

FIG. 1 shows an exemplary architecture of a system 100 which may be used by a method and apparatus for generating image information according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may shoot a reference image using the terminal devices 101, 102, 103 and send the captured reference image to the server 105 via the network 104. The terminal devices 101, 102, and 103 may be terminal devices possessing various functions, such as a photographing function and a video shooting function.

The terminal devices 101, 102, 103 may be various electronic devices, including but not limited to smartphones, tablets, laptops, photographic cameras, video cameras, cameras, etc.

The server 105 may be a server providing various services. For example, the server 105 may be a backend image processing server that may process the received reference image sent from the terminal devices 101, 102 and 103. The backend image processing server may process (i.e., analyze) the data such as the received reference image, and store or output the processing result (e.g., a feature point descriptor).

It should be noted that the method for generating image information provided by the embodiments of the present disclosure is generally executed by the server 105, accordingly, the apparatus for generating image information is generally provided in the server 105.

It should be appreciated that the numbers of the terminal devices, the networks and the servers in FIG. 1 are merely illustrative. Any number of terminal devices, networks and servers may be provided based on the actual requirements. In the case where the reference image is stored in the server 105, the terminal devices 101, 102, and 103 may not be provided in the system architecture 100.

Figure 2:
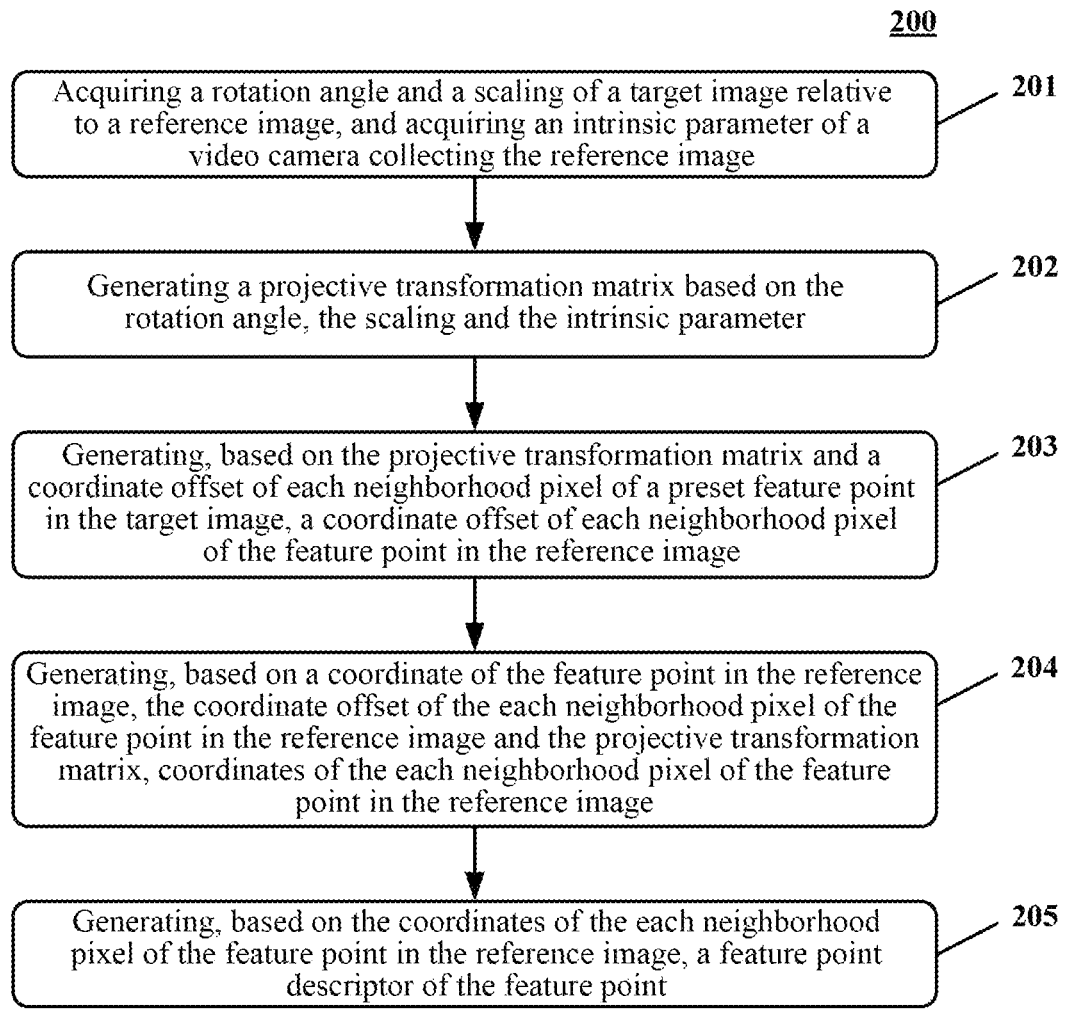
FIG. 2 is a flowchart of an embodiment of a method for generating image information according to the present disclosure.

With further reference to FIG. 2, a flow 200 of an embodiment of a method for generating image information according to the present disclosure is illustrated. The method for generating image information includes the following steps:

Step 201, acquiring a rotation angle and a scaling of a target image relative to a reference image, and acquiring an intrinsic parameter of a video camera collecting the reference image.

In the present embodiment, an electronic device (e.g., the server 105 as illustrated in FIG. 1) on which the method for generating image information operate may acquire a rotation angle and a scaling of a target image relative to a reference image, and acquire an intrinsic parameter of a video camera collecting the reference image.

In the conventional method of generating a feature point descriptor, it is often necessary to set the information such as the rotation angle and the scaling of the target image relative to the reference image in advance, and projective transform the reference image based on the information set in advance to generate the target image. However, in the present embodiment, it is possible to only set the rotation angle and the scaling of the target image relative to the reference image in advance, without generating the target image.

In the present embodiment, the intrinsic parameter of video cameras from different models may be varied. The intrinsic parameter is a parameter related to a video camera's intrinsic characteristics. The internal parameter may include parameter such as the focal length and the pixel size of the video camera.

Step 202, generating a projective transformation matrix based on the rotation angle, the scaling and the intrinsic parameter.

In the present embodiment, the electronic device may generate a projective transformation matrix based on the rotation angle, the scaling and the intrinsic parameter acquired in step 201.

Here, we may select a video camera coordinate system. In the video camera coordinate system, the origin is the optical center of the video camera, the X axis and the Y axis are parallel to the coordinate axis of the plane-coordinate system where the reference image is located, and the Z axis is the optical axis of the video camera, which is parallel to the plane of the reference image. The projective transformation matrix may be used to allow the coordinates of each pixel of the reference image in the video camera coordinate system correspond to the coordinates of each pixel of the target image in the video camera coordinate system. For example, set the coordinates of each pixel of the reference image in the video camera coordinate system as $(x_i',y_i',z_i')$, the coordinates of each pixel of the target image in the video camera coordinate system as $(x_i,y_i,z_i)$, and the coordinates of the each pixel in the reference image in the video camera coordinate system may correspond to the coordinates of each pixel in the target image in the video camera coordinate system using the following formula:

$$H\begin{bmatrix} x_i' \\ y_i' \\ z_i' \end{bmatrix} = \begin{bmatrix} x_i \\ y_i \\ z_i \end{bmatrix}$$

Here, i is a positive integer and i≥1, (x',y',z') are the coordinates of the pixels in the reference image in the video camera coordinate system, $(x_i',y_i',z_i')$ is the coordinate of the $i^{th}$ pixel in the reference image in the video camera coordinate system, (x,y,z) is the coordinates of the pixels in the target image in the video camera coordinate system, $(x_i,y_i,z_i)$ is the coordinate of the $i^{th}$ pixel in the target image in the video camera coordinate system, and H is the projective transformation matrix from the reference image to the target image.

In some alternative implementations of the present embodiment, the electronic device may generate the rotation matrix, the translation matrix and the intrinsic parameter matrix based on the rotation angle, the scaling and the intrinsic parameter, and generate the projective transformation matrix based on the rotation matrix, the translation matrix and the intrinsic parameter matrix. For example, the electronic device may generate the projective transformation matrix H using the following formula:

$$H = K \times (R + T \times N^T/d) \times K^{-1}$$

Here, K is the intrinsic parameter matrix, $K^{-1}$ is the inverse matrix of the intrinsic parameter matrix K, R is the rotation matrix, T is the translation matrix, N is the normal vector of the plane of the reference image, $N^T$ is the transpose of the normal vector N of the plane of the reference image, and d is the distance from the origin of the world coordinate system to the plane of the reference image.

Here, the coordinate values in the world coordinate system are the absolute coordinates of the objective world, for describing the positions of the video camera and the reference image, which may usually be selected by the user. For the convenience of calculation, we can select the world coordinate system so that the value of the distance d from the selected origin of the world coordinate system to the plane of the reference image is 1.

In some alternative implementations of the present embodiment, the electronic device may generate the rotation matrix and the translation matrix based on the rotation angle and the scaling, and generate the intrinsic parameter matrix based on the intrinsic parameter. Here, the rotation angle and the scaling may also be referred to as the extrinsic parameter of the video camera, and the rotation matrix and the translation matrix may also be referred to as the extrinsic parameter matrix of the video camera.

It should be noted that the various methods of generating the intrinsic parameter matrix, the rotation matrix and the translation matrix are well-known technologies that has been widely studied and applied by far, and detailed description thereof will be omitted.

Step 203, generating, based on the projective transformation matrix and a coordinate offset of each neighborhood pixel of a preset feature point in the target image, a coordinate offset of each neighborhood pixel of the feature point in the reference image.

In the present embodiment, based on the projective transformation matrix generated in step 202 and a coordinate offset of each neighborhood pixel of a preset feature point in the target image, the electronic device may generate a coordinate offset of each neighborhood pixel of the feature point in the reference image.

In the conventional method of generating the feature point descriptor, it is usually necessary to select a square region with the feature point as the center on the target image. The pixels contained in the square region are the individual neighborhood pixels of the feature point. In the case where the size of the selected square region does not change, the coordinate offset of each neighborhood pixel of the feature point is constant regardless of which feature point is selected from the target image. Therefore, in the case where the target image is not generated, the coordinate offset of each neighborhood pixel of the feature point in the target image may be obtained based on the plane set in advance where the target image is located and the square region where each neighboring pixel of the selected feature point are located. For example, set the plane of the target image as the xOy plane, when the selected square region contains 4 pixels, if the coordinate of the selected feature point is (0,0), and the coordinates of each neighborhood pixel of the feature point (0,0) are respectively (−1,−1), (−1,1), (1,−1) and (1,1), the coordinate offset of each neighborhood pixel of the feature point (0,0) equals to the coordinate of each neighborhood pixel of the feature point (0,0) minusing the coordinate of the feature point (0,0), i.e., are respectively (−1,−1), (−1,1), (1,−1) and (1,1). If the coordinate of the selected feature point is (1,1), and the coordinates of each neighborhood pixel of the feature point (1,1) are respectively (0,0), (0,2), (2, 0) and (2,2), the coordinate offset of each neighborhood pixel of the feature point (1,1) equals to the coordinates of each neighborhood pixel of the feature point (1,1) minusing the coordinate of the feature point (1,1), i.e., still are respectively (−1,−1), (−1,1), (1,−1) and (1,1).

In some alternative implementations of the present embodiment, the electronic device may calculate the non-normalized coordinate offset $(ox_j', oy_j', oz_j')$ of each neighborhood pixel of the feature point in the reference image using the following formula:

$$\begin{bmatrix} ox_j' \\ oy_j' \\ oz_j' \end{bmatrix} = H^{-1} \begin{bmatrix} ox_j \\ oy_j \\ oz_j \end{bmatrix}$$

Here, j is a positive integer and j≥1, (ox',oy',oz') is the non-normalized coordinate offset of the neighborhood pixel of the feature point in the reference image, $(ox_j', oy_j', oz_j')$ is the non-normalized coordinate offset of the $j^{th}$ neighborhood pixel of the feature point in the reference image, $H^{-1}$ is the inverse matrix of the projective transformation matrix H, and (ox,oy,oz) is the coordinate offset of the neighborhood pixel of the feature point in the target image, and generally oz=0 $(ox_j, oy_j, oz_j)$ is the coordinate offset of the $j^{th}$ neighborhood pixel of the feature point in the target image, and generally $oz_j=0$.

Step 204, generating, based on a coordinate of the feature point in the reference image, the coordinate offset of each neighborhood pixel of the feature point in the reference image and the projective transformation matrix, coordinates of each neighborhood pixel of the feature point in the reference image.

In the present embodiment, based on the coordinate of the pre-acquired feature point in the reference image, the coordinate offset of each neighborhood pixel of the feature point in the reference image generated in step 203 and the projective transformation matrix generated in step 202, the electronic device may generate coordinates of each neighborhood pixel of the feature point in the reference image.

In some alternative implementations of the present embodiment, the electronic device may first process the coordinate of the feature point in the reference image with the third dimension of the projective transformation matrix, and then add the processed coordinate of the feature point in the reference image to the coordinate offset of each neighborhood pixel of the feature point in the reference image, to generate the coordinates of each neighborhood pixel of the feature point in the reference image.

Step 205, generating, based on the coordinates of each neighborhood pixel of the feature point in the reference image, a feature point descriptor of the feature point.

In the present embodiment, based on the coordinates of each neighborhood pixel of the feature point in the reference image generated in step 204, the electronic device may generate the feature point descriptor of the feature point. Here, the coordinates of each neighborhood pixel of the feature point in the reference image may be the normalized coordinates of each neighborhood pixel of the feature point in the reference image.

In some alternative implementations of the present embodiment, the electronic device may generate the feature point descriptor of the feature point by using a random ferns algorithm to process the coordinates of each neighborhood pixel of the feature point in the reference image. Here, the random ferns algorithm may generate the feature point descriptor of the feature point rapidly based on the naive Bayesian classification algorithm.

It should be noted that the various methods of generating the feature point descriptor of the feature point using the coordinate of each neighborhood pixel of the feature point are well-known technologies that has been widely studied and applied by far, and detailed description thereof will be omitted.

In some alternative implementations of the present embodiment, the method may further include: reconstruct three-dimensionally the reference image based on the feature point descriptor of the feature point. Here, if the reference image is to be reconstructed three-dimensionally, the target image may include a plurality of images having different rotation angles and scaling relative to the reference image. The feature point may include a plurality of feature points in the target image.

In some alternative implementations of the present embodiment, the method may further include: train, by using a machine leaning method based on the feature point descriptor of the feature point and a category of the feature point, to obtain a feature point classification model. Here, the feature point classification model is used to characterize a correspondence between the feature point descriptor of the feature point and the category of the feature point. Before training the feature point classification model, it is necessary that the feature point descriptor corresponds to the category of the feature point, then the feature point classification model may be trained by taking the feature point descriptor and the category of the feature point as the training samples.

The method for generating image information provided by the embodiments of the present disclosure generates a projective transformation matrix based on an acquired rotation angle, a scaling of a target image relative to a reference image and acquired intrinsic parameter of a video camera collecting the reference image, generates a coordinate offset of each neighborhood pixel of the feature point in the reference image based on the projective transformation matrix and a coordinate offset of each neighborhood pixel of a feature point in the target image, then generates coordinates of each neighborhood pixel of the feature point in the reference image based on a coordinate of the feature point in the reference image, the coordinate offset of each neighborhood pixel of the feature point in the reference image and the projective transformation matrix, and finally generates the feature point descriptor of the feature point based on the coordinates of each neighborhood pixel of the feature point in the reference image. It achieves a projective transformation of the coordinates of each neighborhood pixel of the feature point in the target image to the reference image without generating the target image, and extracts the projective transformed coordinates of each neighborhood pixel of the feature point from the reference image to generate the feature point descriptor, thereby reducing the computational complexity of generating the feature point descriptor.

Figure 3:
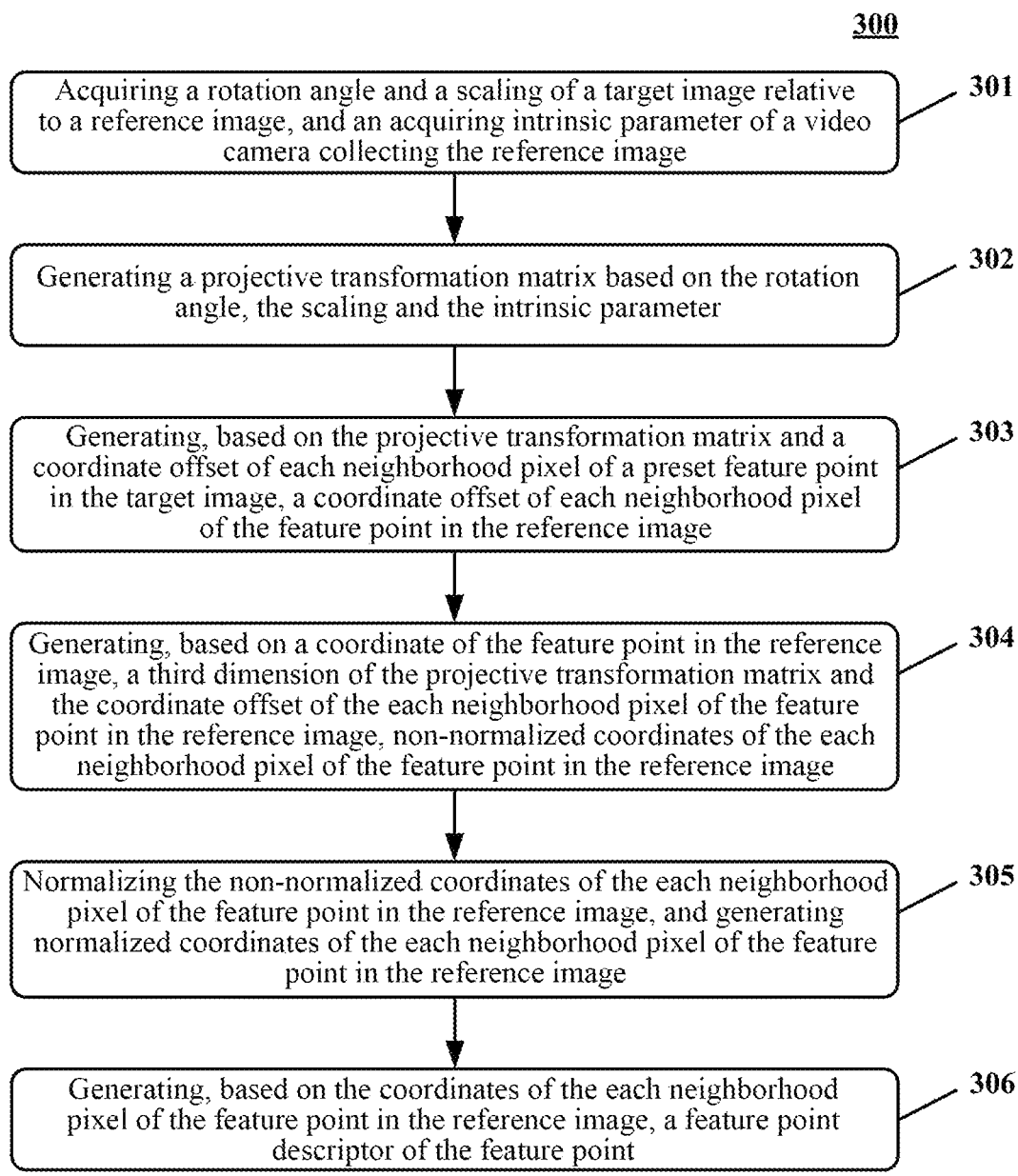
FIG. 3 is a flowchart of another embodiment of the method for generating image information according to the present disclosure.

With further reference to FIG. 3, a flow 300 of another embodiment of the method for generating image information is illustrated. The flow 300 of the method for generating image information includes the following steps:

Step 301, acquiring a rotation angle and a scaling of a target image relative to a reference image, and acquiring an intrinsic parameter of a video camera collecting the reference image.

In the present embodiment, an electronic device (e.g., the server 105 as illustrated in FIG. 1) on which the method for generating image information operate may acquire a rotation angle and a scaling of a target image relative to a reference image, and acquire an intrinsic parameter of a video camera collecting the reference image.

Step 302, generating a projective transformation matrix based on the rotation angle, the scaling and the intrinsic parameter.

In the present embodiment, the electronic device may generate a projective transformation matrix based on the rotation angle, the scaling and the intrinsic parameter acquired in step 301. Here, the projective transformation matrix may be used to allow the coordinates of each pixel in the reference image correspond to the coordinates of each pixel in the target image.

Step 303, generating, based on the projective transformation matrix and a coordinate offset of each neighborhood pixel of a preset feature point in the target image, a coordinate offset of each neighborhood pixel of the feature point in the reference image.

In the present embodiment, based on the projective transformation matrix generated in step 302 and a coordinate offset of each neighborhood pixel of a preset feature point in the target image, the electronic device may generate a coordinate offset of each neighborhood pixel of the feature point in the reference image.

Step 304, generating, based on a coordinate of the feature point in the reference image, a third dimension of the projective transformation matrix and the coordinate offset of each neighborhood pixel of the feature point in the reference image, non-normalized coordinates of each neighborhood pixel of the feature point in the reference image.

In the present embodiment, based on a coordinate of the pre-acquired feature point in the reference image, the coordinate offset of each neighborhood pixel of the feature point in the reference image generated in step 303 and the projective transformation matrix generated in step 302, the electronic device may generate non-normalized coordinates of each neighborhood pixel of the feature point in the reference image.

In some alternative implementations of the present embodiment, the electronic device may calculate the parameter k using the following formula:

$$k = h310 \times x0 + h320 \times y0 + h330$$

Here, (x0,y0) is the coordinate of the feature point in the reference image, the projective transformation matrix is $$H = \begin{bmatrix} h110 & h120 & h130 \\ h210 & h220 & h230 \\ h310 & h320 & h330 \end{bmatrix},$$

and the third dimension of the projective transformation matrix H is (h310,h320,h330).

The non-normalized coordinate $(xos_j, yos_j, zos_j)$ of each neighborhood pixel of the feature point in the reference image is calculated using the following formula:

$$(xos_j, yos_j, zos_j) = (x0/k + ox_j', y0/k + oy_j', 1/k + oz_j')$$

Here, j is a positive integer and j≥1, (xos,yos,zos) are the non-normalized coordinates of the neighborhood pixels of the feature point in the reference image, $(xos_j, yos_j, zos_j)$ is the non-normalized coordinate of the $j^{th}$ neighborhood pixel of the feature point in the reference image, (ox',oy',oz') is the non-normalized coordinate offset of the neighborhood pixels of the feature point in the reference image, and $(ox_j', oy_j', oz_j')$ is the non-normalized coordinate offset of the $j^{th}$ neighborhood pixel of the feature point in the reference image.

Step 305, normalizing the non-normalized coordinates of each neighborhood pixel of the feature point in the reference image, and generating normalized coordinates of each neighborhood pixel of the feature point in the reference image.

In the present embodiment, based on the non-normalized coordinates of each neighborhood pixel of the feature point in the reference image generated in step 304, the electronic device may normalize the non-normalized coordinates of each neighborhood pixel of the feature point in the reference image, and generate normalized coordinates of each neighborhood pixel of the feature point in the reference image.

In some alternative implementations of the present embodiment, the electronic device may calculate the normalized coordinates $(xo_j, yo_j, 1)$ of each neighborhood pixel of the feature point in the reference image using the following formula:

$$(xo_j, yo_j, 1) = (xos_j/zos_j, yos_j/zos_j, zos_j/zos_j);$$

Here, j is a positive integer and j≥1, (xo,yo,1) are the normalized coordinates of the neighborhood pixels of the feature point in the reference image, $(xo_j, yo_j, 1)$ is the normalized coordinate of the $j^{th}$ neighborhood pixel of the feature point in the reference image, (xos,yos,zos) are the non-normalized coordinates of the neighborhood pixels of the feature point in the reference image, and $(xos_j, yos_j, zos_j)$ is the non-normalized coordinate of the $j^{th}$ neighborhood pixel of the feature point in the reference image.

Step 306, generating, based on the coordinates of each neighborhood pixel of the feature point in the reference image, a feature point descriptor of the feature point.

In the present embodiment, based on the coordinates of each neighborhood pixel of the feature point in the reference image generated in step 305, the electronic device may generate the feature point descriptor of the feature point. Here, the coordinates of each neighborhood pixel of the feature point in the reference image may be the normalized coordinates of each neighborhood pixel of the feature point in the reference image.

As can be seen from FIG. 3, the flow 300 of the method for generating image information in the present embodiment, as compared with the corresponding embodiment in FIG. 2, highlights the step of normalizing the coordinates of each neighborhood pixel of the feature point in the reference image. Thus, in the solution described by the present embodiment, the feature point descriptor is generated by adopting the normalized coordinates of each neighborhood pixel of the feature point in the reference image, thereby further reducing the computational complexity of generating the feature point descriptor.

Figure 4:
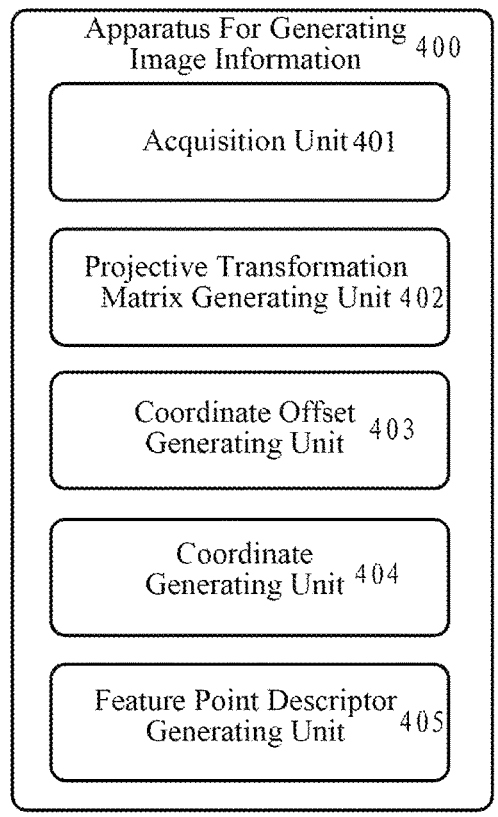
FIG. 4 is a schematic structural diagram of an embodiment of an apparatus for generating image information according to the present disclosure.

With further reference to FIG. 4, as an implementation to the method illustrated in the above figures, the present disclosure provides an embodiment of an apparatus for generating image information. The apparatus embodiment corresponds to the method embodiment shown in FIG. 2, and the apparatus may be specifically applied to various electronic devices.

As shown in FIG. 4, the apparatus 400 for generating image information illustrated by the present embodiment may includes: an acquisition unit 401, a projective transformation matrix generating unit 402, a coordinate offset generating unit 403, a coordinate generating unit 404 and a feature point descriptor generating unit 405. Here, the acquisition unit 401 is configured to acquire a rotation angle and a scaling of a target image relative to a reference image, and acquire an intrinsic parameter of a video camera collecting the reference image. The projective transformation matrix generating unit 402 is configured to generate a projective transformation matrix based on the rotation angle, the scaling and the intrinsic parameter. The coordinate offset generating unit 403 is configured to generate, based on the projective transformation matrix and a coordinate offset of each neighborhood pixel of a preset feature point in the target image, a coordinate offset of each neighborhood pixel of the feature point in the reference image. The coordinate generating unit 404 is configured to generate, based on a coordinate of the feature point in the reference image, the coordinate offset of each neighborhood pixel of the feature point in the reference image and the projective transformation matrix, coordinates of each neighborhood pixel of the feature point in the reference image. The feature point descriptor generating unit 405 is configured to generate, based on the coordinates of each neighborhood pixel of the feature point in the reference image, a feature point descriptor of the feature point.

In the present embodiment, in the apparatus 400 for generating image information: the specific processing and the technical effects thereof of the acquisition unit 401, the projective transformation matrix generating unit 402, the coordinate offset generating unit 403, the coordinate generating unit 404 and the feature point descriptor generating unit 405 may refer to the related descriptions of the step 201, the step 202, the step 203, the step 204 and the step 205 in the corresponding embodiment in FIG. 2 respectively, detailed description thereof will be omitted.

In some alternative implementations of the present embodiment, the projective transformation matrix generating unit 402 may include: a first matrix generating subunit (not shown in the figure), configured to generate a rotation matrix, a translation matrix and an intrinsic parameter matrix based on the rotation angle, the scaling and the intrinsic parameter; and a second matrix generating subunit (not shown in the figure), configured to generate the projective transformation matrix based on the rotation matrix, the translation matrix and the intrinsic parameter matrix.

In some alternative implementations of the present embodiment, the coordinate generating unit 404 may include: a non-normalized coordinate generating subunit (not shown in the figure), configured to generate, based on the coordinate of the feature point in the reference image, a third dimension of the projective transformation matrix and the coordinate offset of each neighborhood pixel of the feature point in the reference image, non-normalized coordinates of each neighborhood pixel of the feature point in the reference image; and a normalized coordinate generating subunit (not shown in the figure), configured to normalize the non-normalized coordinates of each neighborhood pixel of the feature point in the reference image, and generate normalized coordinates of each neighborhood pixel of the feature point in the reference image.

In some alternative implementations of the present embodiment, the feature point descriptor generating unit 405 may be further configured to: generate the feature point descriptor of the feature point by using a random ferns algorithm to process the coordinates of each neighborhood pixel of the feature point in the reference image.

In some alternative implementations of the present embodiment, the apparatus 400 for generating image information may further include: a three-dimension reconstructing unit (not shown in the figure), configured to reconstruct three-dimensionally the reference image based on the feature point descriptor of the feature point.

In some alternative implementations of the present embodiment, the apparatus 400 for generating image information may further include: a training unit (not shown in the figure), configured to train, by using a machine leaning method based on the feature point descriptor of the feature point and a category of the feature point, to obtain a feature point classification model, wherein the feature point classification model is used to characterize a correspondence between the feature point descriptor of the feature point and the category of the feature point.

Figure 5:
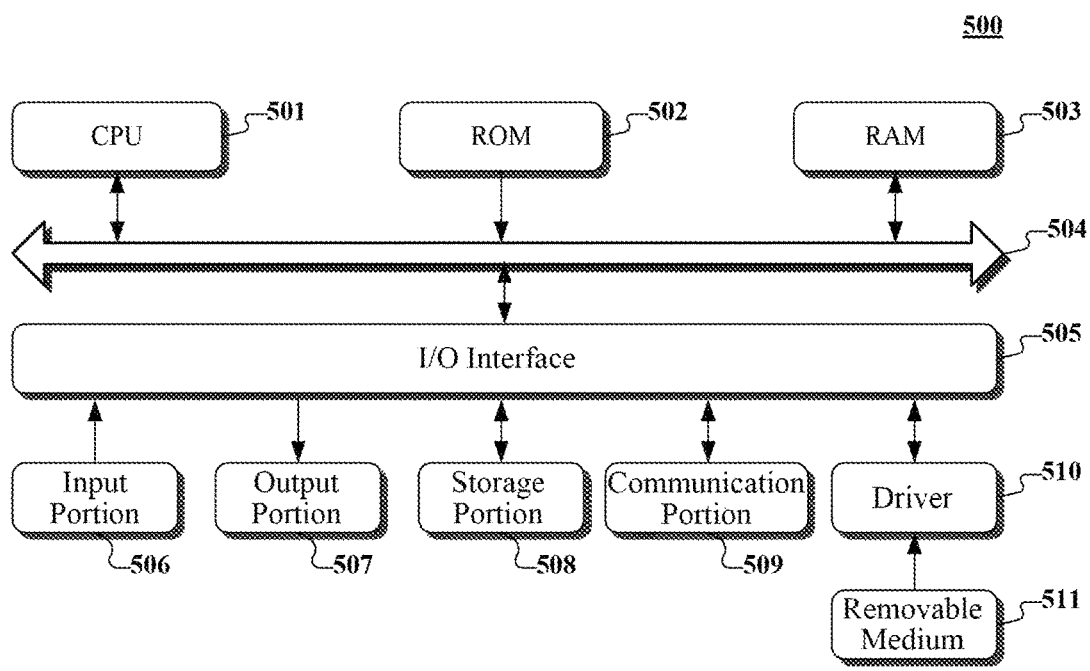
FIG. 5 is a schematic structural diagram of a computer system adapted to implement a server of the embodiments of the present disclosure.

With reference to FIG. 5, a schematic structural diagram of a computer system 500 adapted to implement a server of the embodiments of the present disclosure is illustrated. The server shown in FIG. 5 is merely an example and should not impose any restriction on the functions and the scope of use of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present application.

It needs to be noted that the computer readable medium in the present disclosure may be computer readable signal medium or computer readable storage medium or a combination thereof. An example of the computer readable storage medium may include but not limited to: systems, apparatus or elements of electric, magnet, optical, electromagnet, infrared ray, or semiconductor or a combination thereof. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or a combination thereof. In the present disclosure, the computer readable storage medium may be any physical medium containing or storing programs which can be used by a command execution system, apparatus or element or the incorporation thereof. In the present disclosure, the computer readable signal medium may include data signal in the base band or propagating as parts of a carrier in which computer readable program codes are carried. The propagated signal may take various forms, include but is not limited to: an electromagnetic signal, an optical signal or a combination thereof. The signal medium that can be read by computer may be any computer readable medium except for the computer readable storage medium. The computer readable medium is capable of transmitting, propagating or transferring programs for used by or used in combination with a command execution system, apparatus or element. The program codes contained on the computer readable medium may be transmitted with any suitable medium including but is not limited to: a wireless medium, a wired medium, an optical cable medium, a RF medium and the like, or any combination thereof.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an acquisition unit, a projective transformation matrix generating unit, a coordinate offset generating unit, a coordinate generating unit and a feature point descriptor generating unit, where the names of these units or modules are not considered as a limitation to the units or modules. For example, the acquisition unit may also be described as "a unit for acquiring a rotation angle and a scaling of a target image relative to a reference image, and acquiring an intrinsic parameter of a video camera collecting the reference image."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquiring a rotation angle and a scaling of a target image relative to a reference image, and acquiring an intrinsic parameter of a video camera collecting the reference image; generating a projective transformation matrix based on the rotation angle, the scaling and the intrinsic parameter; generating, based on the projective transformation matrix and a coordinate offset of each neighborhood pixel of a preset feature point in the target image, a coordinate offset of each neighborhood pixel of the feature point in the reference image; generating, based on a coordinate of the feature point in the reference image, the coordinate offset of the each neighborhood pixel of the feature point in the reference image and the projective transformation matrix, coordinates of the each neighborhood pixel of the feature point in the reference image; and generating, based on the coordinates of the each neighborhood pixel of the feature point in the reference image, a feature point descriptor of the feature point.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for generating image information, comprising:
   acquiring a rotation angle and a scaling of a target image relative to a reference image, and acquiring an intrinsic parameter of a video camera collecting the reference image;
   generating a projective transformation matrix based on the rotation angle, the scaling and the intrinsic parameter;
   generating, based on the projective transformation matrix and a coordinate offset of each neighborhood pixel of a preset feature point in the target image, a coordinate offset of each neighborhood pixel of the feature point in the reference image;
   generating, based on a coordinate of the feature point in the reference image, the coordinate offset of the each neighborhood pixel of the feature point in the reference image and the projective transformation matrix, coordinates of the each neighborhood pixel of the feature point in the reference image; and
   generating, based on the coordinates of the each neighborhood pixel of the feature point in the reference image, a feature point descriptor of the feature point.

2. The method according to claim 1, wherein the generating a projective transformation matrix based on the rotation angle, the scaling and the intrinsic parameter comprises:
   generating a rotation matrix, a translation matrix and an intrinsic parameter matrix based on the rotation angle, the scaling and the intrinsic parameter; and
   generating the projective transformation matrix based on the rotation matrix, the translation matrix and the intrinsic parameter matrix.

3. The method according to claim 2, wherein the generating, based on a coordinate of the feature point in the reference image, the coordinate offset of the each neighborhood pixel of the feature point in the reference image and the projective transformation matrix, coordinates of the each neighborhood pixel of the feature point in the reference image comprises:
   generating, based on the coordinate of the feature point in the reference image, a third dimension of the projective transformation matrix and the coordinate offset of the each neighborhood pixel of the feature point in the reference image, non-normalized coordinates of the each neighborhood pixel of the feature point in the reference image; and
   normalizing the non-normalized coordinates of the each neighborhood pixel of the feature point in the reference image, and generating normalized coordinates of the each neighborhood pixel of the feature point in the reference image.

4. The method according to claim 1, wherein the generating, based on the coordinates of the each neighborhood pixel of the feature point in the reference image, a feature point descriptor of the feature point comprises:
   generating the feature point descriptor of the feature point by using a random ferns algorithm to process the coordinates of the each neighborhood pixel of the feature point in the reference image.

5. The method according to claim 1, the method further comprising:
   reconstructing the reference image three-dimensionally based on the feature point descriptor of the feature point.

6. The method according to claim 1, the method further comprising:
   training, by using a machine leaning method based on the feature point descriptor of the feature point and a category of the feature point, to obtain a feature point classification model, wherein the feature point classification model is used to characterize a corresponding relation between the feature point descriptor of the feature point and the category of the feature point.

7. An apparatus for generating image information, comprising:
   at least one processor; and
   a memory storing instructions, which when executed by the at least one processor, cause the at least one processor to perform operations, the operations comprising:
   acquiring a rotation angle and a scaling of a target image relative to a reference image, and acquiring an intrinsic parameter of a video camera collecting the reference image;
   generating a projective transformation matrix based on the rotation angle, the scaling and the intrinsic parameter;
   generating, based on the projective transformation matrix and a coordinate offset of each neighborhood pixel of a preset feature point in the target image, a coordinate offset of each neighborhood pixel of the feature point in the reference image;
   generating, based on a coordinate of the feature point in the reference image, the coordinate offset of the each neighborhood pixel of the feature point in the reference image and the projective transformation matrix, coordinates of the each neighborhood pixel of the feature point in the reference image; and
   generating, based on the coordinates of the each neighborhood pixel of the feature point in the reference image, a feature point descriptor of the feature point.

8. The apparatus according to claim 7, wherein the generating a projective transformation matrix based on the rotation angle, the scaling and the intrinsic parameter comprises:
   generating a rotation matrix, a translation matrix and an intrinsic parameter matrix based on the rotation angle, the scaling and the intrinsic parameter; and
   generating the projective transformation matrix based on the rotation matrix, the translation matrix and the intrinsic parameter matrix.

9. The apparatus according to claim 8, wherein the generating, based on a coordinate of the feature point in the reference image, the coordinate offset of the each neighborhood pixel of the feature point in the reference image and the projective transformation matrix, coordinates of the each neighborhood pixel of the feature point in the reference image comprises:
   generating, based on the coordinate of the feature point in the reference image, a third dimension of the projective transformation matrix and the coordinate offset of the each neighborhood pixel of the feature point in the reference image, non-normalized coordinates of the each neighborhood pixel of the feature point in the reference image; and normalizing the non-normalized coordinates of the each neighborhood pixel of the feature point in the reference image, and generating normalized coordinates of the each neighborhood pixel of the feature point in the reference image.

10. The apparatus according to claim 7, wherein the generating, based on the coordinates of the each neighborhood pixel of the feature point in the reference image, a feature point descriptor of the feature point comprises:

generating the feature point descriptor of the feature point by using a random ferns algorithm to process the coordinates of the each neighborhood pixel of the feature point in the reference image.

11. The apparatus according to claim 7, the operations further comprising:

reconstructing three-dimensionally the reference image based on the feature point descriptor of the feature point.

12. The apparatus according to claim 7, the operations further comprising:

training, by using a machine leaning method based on the feature point descriptor of the feature point and a category of the feature point, to obtain a feature point classification model, wherein the feature point classification model is used to characterize a corresponding relation between the feature point descriptor of the feature point and the category of the feature point.

13. A non-transitory computer readable storage medium, storing a computer program thereon, the computer program, when executed by a processor, cause the processor to perform operations, the operations comprising:

acquiring a rotation angle and a scaling of a target image relative to a reference image, and acquiring an intrinsic parameter of a video camera collecting the reference image;

generating a projective transformation matrix based on the rotation angle, the scaling and the intrinsic parameter;

generating, based on the projective transformation matrix and a coordinate offset of each neighborhood pixel of a preset feature point in the target image, a coordinate offset of each neighborhood pixel of the feature point in the reference image;

generating, based on a coordinate of the feature point in the reference image, the coordinate offset of the each neighborhood pixel of the feature point in the reference image and the projective transformation matrix, coordinates of the each neighborhood pixel of the feature point in the reference image; and generating, based on the coordinates of the each neighborhood pixel of the feature point in the reference image, a feature point descriptor of the feature point.

* * * * *